United States Patent [19]

Vreeswijk et al.

[11] Patent Number: 5,027,206

[45] Date of Patent: Jun. 25, 1991

[54] HIGH-DEFINITION TELEVISION SYSTEMS

[75] Inventors: Franciscus W. P. Vreeswijk, Eindhoven, New Zealand; Christopher M. Carey Smith, Christ Church, Netherlands

[73] Assignee: U.S. Philips Corporation, New York, N.Y.

[21] Appl. No.: 406,928

[22] Filed: Sep. 13, 1989

[30] Foreign Application Priority Data

Sep. 16, 1988 [GB] United Kingdom ................. 8821764
Dec. 19, 1988 [NL] Netherlands ......................... 8803100

[51] Int. Cl.$^5$ .............................................. H04N 7/04
[52] U.S. Cl. .................................... 358/141; 358/142; 358/105; 358/138
[58] Field of Search ............... 358/141, 140, 138, 133, 358/105, 142, 147, 146

[56] References Cited

U.S. PATENT DOCUMENTS

| | | | |
|---|---|---|---|
| 4,641,188 | 2/1987 | Dischert | 358/140 |
| 4,941,044 | 7/1990 | Trew | 358/138 |
| 4,965,667 | 10/1990 | Trew et al. | 358/105 |

OTHER PUBLICATIONS

Sforey, R., "HDTV Motion Adaptive Bandwidth Reduction Using DATV", BBC Research Report #1986/5.

Primary Examiner—Howard W. Britton
Assistant Examiner—David E. Harvey
Attorney, Agent, or Firm—Michael E. Marion

[57] ABSTRACT

Use is made of a digitally assisted DATV to effect a bandwidth reduction encoding and bandwidth reduction decoding, in addition to MAC-coding and MAC-decoding, of at least three picture signal channels (PC) each having a different picture signal refresh period equal to, for example, 80, 40 and 20 ms which are coupled via a time-division multiplex circuit (MUX). For with the diversity of picture signal sources, it was found that distinguishing during the picture signal processing between a film mode (SW1, T40) and a non-film mode (SW1, T20) results in a significantly improved high-definition picture resolution. This distinction is expressed at the DATV by one information bit (FM'). During the non-film mode (SW1, T20) three Y-liminance channels (PC11, PC13 and PC12) of 80, 40 and 20 ms and two U and V-chrominance channels (PC21 and PC22) of 80 and 20 ms are operative. During the film mode (SW11, T40) the Y-channels (PC11 and PC13) and the U and V-channels (PC21 and PC23) of 80 and 40 ms are only operative.

3 Claims, 2 Drawing Sheets

HIGH-DEFINITION TELEVISION SYSTEMS

BACKGROUND OF THE INVENTION

The invention relates to a method of encoding a picture signal to obtain an encoded picture signal, comprising the steps of:

receiving said picture signal, determining motion vectors relating to motion in a picture of said picture signal, obtaining a selection signal to select one operation mode out of a plurality of possible operation modes on said picture signal depending on said selection signal to obtain a picture signal to be encoded, digitally encoding said selection signal and said motion vectors to obtain an assisting signal to inform a decoder which one of said plurality of operation modes has been selected and about said motion vectors, and encoding said picture signal to be encoded and said assisting signal to obtain said encoded picture signal.

The invention also relates to an apparatus for encoding a picture signal to obtain an encoded picture signal, comprising:

means for receiving said picture signal, means coupled to said receiving means for determining motion vectors relating to motion in a picture of said picture signal, means for obtaining a selection signal, means coupled to said selection signal obtaining means for selecting one operation mode out of a plurality of possible operation modes on said picture signal depending on said selection signal to obtain a picture signal to be encoded, means coupled to said selection signal obtaining means and said motion vector determining means for digitally encoding said selection signal and said motion vectors to obtain an assisting signal to inform a decoder which one of said plurality of operation modes has been selected and about said motion vectors, and means coupled to said selecting means and said digitally encoding means for encoding said picture signal to be encoded and said assisting signal to obtain said encoded picture signal.

The invention further relates to an apparatus for decoding a picture signal to obtain a decoded picture signal, comprising:

means coupled to receive said picture signal for decoding said picture signal to obtain a picture signal to be processed and an assisting signal including a selection signal and a motion vector information signal, means coupled to said decoding means to receive said selection signal and said motion vector information signal for selecting one operation mode out of a plurality of possible operation modes on said picture signal to be processed depending on said selection signal, at least one of said plurality of possible operation modes including a motion compensated interpolation using said motion vector information signal.

Such a high-definition television system is described in the Proceedings of the Second International Workshop on Signal Processing of HDTV, 29 Feb. to 3 Mar. 1988, L'Aguila, Italy, in a paper of M. R. Haghiri et al., entitled "Motion Compensated Interpolation applied to HD-MAC pictures encoding and decoding." For television the introduction of high-definition television (HDTV) for home use is described. Based on what is commonly referred to as the MAC-system (Multiplexed Analog Components) with its limited bandwidth a compatible high-definition system (HD-MAC) is described. In the description it is assumed that there must be a balance between the best HD-MAC picture available for specific receivers and the capability of preserving an acceptable quality for existing MAC-receivers. To that end it is proposed to use in the encoder circuit and the complementary, i.e. inversely operating, decoder circuit three picture signal channels having a shortest, a medium and a longest picture signal refresh period, the shortest period being equal to 20 ms. Depending on a motion estimation result one of the three channels is utilized locally in the picture. When the motion exceeds 3 picture elements per picture period (20 ms), the channel having the shortest period is used. For motion between 3 and 0.5 picture elements per picture period the channel having the medium period is used and motion vectors are transmitted to allow for a motion compensated interpolation in a decoder. For motion not exceeding 0.5 picture elements per picture period the channel having the longest period is used. Thus, to achieve the picture signal bandwidth reduction, use is made of splitting the picture into sub-pictures which are stationary or evidence some motion or much motion, respectively.

The above mentioned system has as drawback a rather costly decoder. It is inter alia an object of the invention to provide a system which allows for a cheaper decoder.

SUMMARY OF THE INVENTION

According to a first aspect of the invention, an encoding method of the kind described in the preamble is therefore characterized by receiving a film mode information signal indicating whether said picture signal originates from film, said selecting step further depending on said film mode information signal, and digitally encoding said film mode information signal, said assisting signal also comprising said film mode information signal to inform said decoder whether said picture signal originates from film.

According to a second aspect of the invention, an encoding apparatus of the kind described in the preamble is therefore characterized by means for receiving a film mode information signal indicating whether said picture signal originates from film, said selecting means being coupled to said film mode information signal receiving means to select said one operation mode further depending on said film mode information signal, and means for digitally encoding said film mode information signal, said assisting signal also comprising said film mode information signal to inform said decoder whether said picture signal originates from film.

According to a third aspect of the invention, a decoding apparatus of the kind described in the preamble is therefore characterized in that said selecting means are further coupled to said decoding means to receive a film mode information signal included in said assisting signal to select said one operation mode further depending on said film mode information signal.

The invention is inter alia based on the recognition that normally it is not necessary to provide in a chrominance part of a decoder for a picture signal channel having the medium picture signal refresh period and providing a medium resolution, since the eye is not very sensitive to shortcomings in chrominance resolution anyway. As a result of this, a costly chrominance motion compensated interpolation section can be avoided. However, if the picture signal originates from film, an optimum picture quality can be obtained by rendering that picture signal channel inoperative has a picture signal refresh period less than a film frame period. In this situation, it is possible to provide for a simple medium resolution chrominance decoding, since a medium resolution film picture can be obtained by simply combining two received medium resolution fields belonging to the same film frame. The reason of this is that if the picture signal originates from film, no motion compensation is necessary because the temporal resolution provided by the film picture signal is low anyway. Due to the resulting metually different processings in the decoder depending on whether the picture signal originates from film or not, it has now become necessary to inform the decoder about the origin of the picture signal.

It is already known per se from the Proceedings of the Second International Workshop on Signal Processing of HDTV, Feb. 29 to Mar. 3, 1988, L'Aquila, Italy, in a paper of J. van der Meer et al. entitled "Movement Processing for an HD-MAC coding system", that in a non motion compensated HD-MAC system an optimum picture quality can be obtained by rendering that picture signal channel inoperative that has a picture signal refresh period less than a film frame period. In that system it is however not necessary to inform the decoder about the origin of the picture signal, since the selection signal through only comprising information about the selected picture signal channel, comprises all assistance information necessary to decode the HD-MAC signal.

BRIEF DESCRIPTION OF THE DRAWINGS

These and other (more detailed) aspects of the invention and its advantages will now be described and elucidated in greater detail by way of non-limitative example with reference to the accompanying drawings, in which.

DETAILED DESCRIPTION OF PREFERRED EMBODIMENTS OF THE INVENTION

Figure 1:
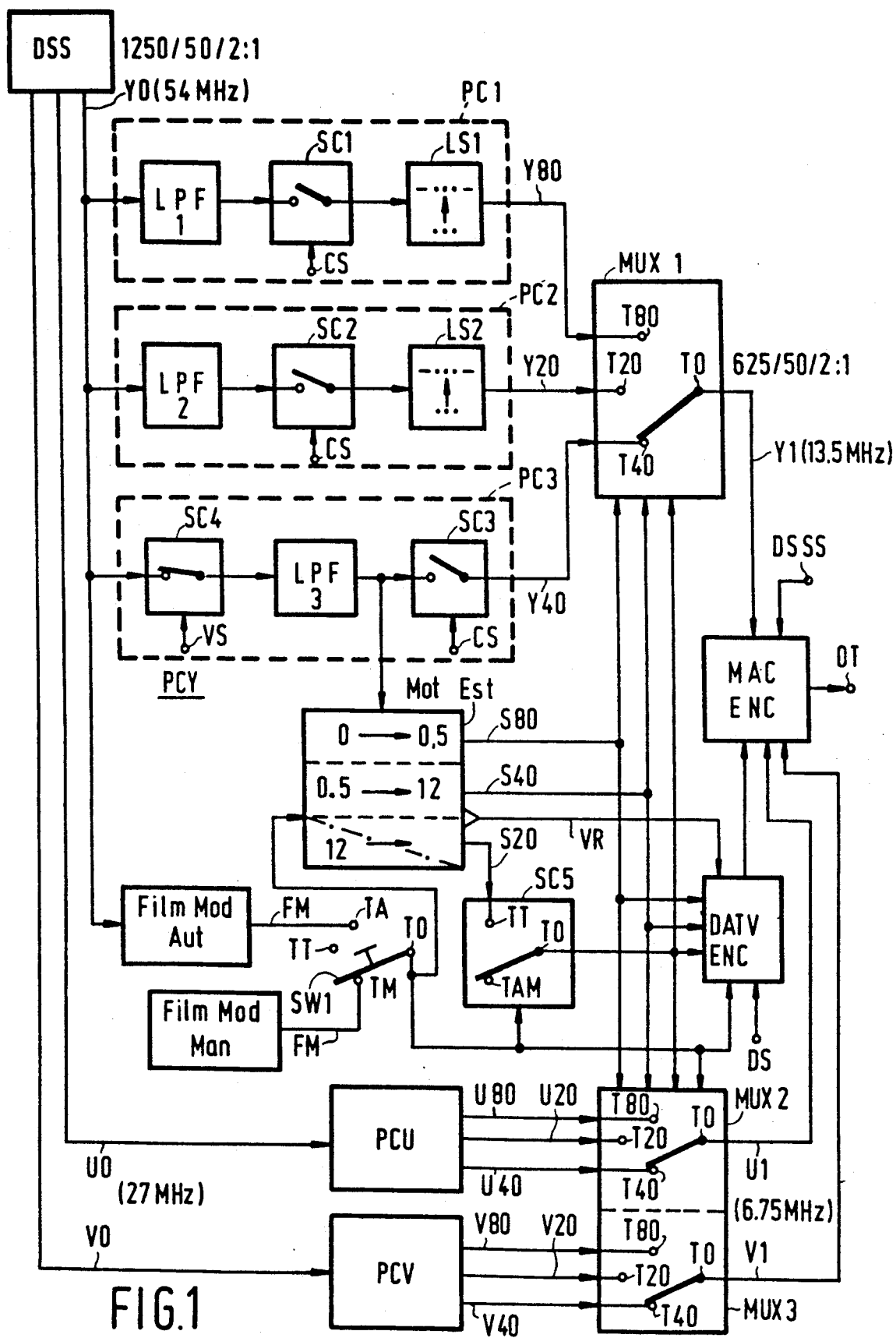
FIG. 1 is a block circuit diagram of a picture signal source suitable for use in a high-definition television system in accordance with the invention for color television and FIG. 2 is a block circuit diagram of a high-definition picture display device suitable therefore.

In the block circuit diagram shown in FIG. 1 of a high-definition picture signal source according to the invention, DSS denotes a, for example, digital signal source. Let it be assumed that the picture signal source of FIG. 1 is suitable for use in a HD-MAC color television system, which is illustrated by means of a MAC-encoder circuit MAC ENC and by the designation 1250/50/2:1 at the signal source DSS. The number 1250 indicates the number of television lines per picture period, wherein 50 single interlaced (2:1) fields form 25 pictures. A television line period, not shown, is equal to 32 $\mu$s. The signal source DSS would further be capable of producing a non-interlaced picture signal with which the designation 1250/50/1:1 is associated. The picture signal source DSS supplies, for example, picture signals originating from a television camera or a telecine device with which original 24 Hz film pictures are converted into 25 Hz television pictures. The original film frame period of 41.66 ms is substantially equal to the television picture period of 40 ms and is converted therein, which is indicated by means of a film-television picture period. OT denotes an output of the picture signal source of FIG. 1 which via a picture signal transmission path, not further shown, is coupled to an input IT, shown in FIG. 2, of a high-definition picture display device according to the invention. The connection OT-IT may include a picture signal storage device instead of a transmission channel. Independent of the structure of the connections OT-IT it is assumed that it has a bandwidth which is more limited than the picture signal bandwidth. An example thereof is a transmission or storage bandwidth of 6.75 MHz for a television system 625/50/2:1, whereas an original maximum picture signal bandwidth of 27 MHz is present. This original bandwidth of 27 MHz is present at a luminance signal YO which is sampled at a sampling rate of 54 MHz, which is indicated by YO (54 MHz). Chrominance signals UO and VO having a bandwidth of 13.5 MHz are sampled at a sampling rate of 27 MHz, which is indicated by UO and VO (27 MHz). Further sampling rates are designated by (13.5 MHz) and (6.75 MHz). The source DSS is followed by an encoder circuit according to the invention in which a processed luminance signal Y1 (13.5 MHz) and processed chrominance signals U1 and V1 (6.75 MHz) are applied to the encoder circuit MAC ENC. In addition, data signals are applied to the circuit MAC ENC from an encoding circuit DATV ENC, wherein DATV stands for "Digitally Assisted TV", and an applied data signal and sound signal are denoted by DS, SS. In known manner the circuit MAC ENC provides a signal compression and a simultaneous-sequential conversion of the picture signals applied.

In FIG. 1 the luminance signal YO is applied to a Y-signal processing circuit PCY, whereas the chrominance signals UO and VO, respectively, are applied to a similarly structured UO- and VO-signal processing circuit PCU and PCV, respectively. The circuit PCY is further shown in detail with three parallel picture signal channels PC1, PC2 and PC3 which are coupled by a time-division multiplex circuit MUX1 and are connected to the MAC ENC circuit via this multiplex circuit.

The picture signal channel PC1 is shown in the drawing as including a series arrangement of a low-pass filter LPF1, a sampling circuit SC1 which is shown as a switching circuit and to which a sampling clock pulse signal CS is applied and a line shift circuit LS1. The frequency of the clock pulse signal CS is equal to half the luminance sampling rate. The known line shift is illustrated by a solid and a dotted line and an arrow. The circuits SC1 and LS1 provide in known manner a frequency reduction by a factor of four. The channel PC2 is structured in a similar manner with a low-pass filter LPF2, a sampling circuit SC2 and a line shift circuit LS2. The picture signal channel PC3 includes a switching circuit SC4 to which a switching signal VS, occurring with a picture period, is applied, a low-pass filter LPF3 and a sampling circuit SC3 to which the sampling clock pulse signal CS is applied. The switching signal VS provides that the YO-signal is processed for one field period during each picture period.

The output of the low-pass filter LPF3 is coupled to an input of a motion estimator Mot Est. The motion estimator Mot Est is shown as having three portions wherein 0-$>$0.5, 0.5-$>$12 and 12-$>$ illustrate that motion signals S80, S40 and S20, respectively, are supplied as motion estimating results if a motion is detected which is less or greater than a threshold value of 0.5 or 12 picture elements per 40 ms picture period. A dot-and-dash line indicates that in given circumstances, more specifically in a film mode, the motion estimator Mot Est is only operative with a threshold of 0.5 picture elements per picture period, so that also for motion exceeding 12 picture elements per picture period the motion signal S40 contains the information "motion". In addition, the motion estimator Mot Est has an output which is coupled to the encoder circuit DATV ENC for the supply of motion vectors VR thereto, associated with the detection of the threshold values 0.5 or 12 picture elements per picture period being exceeded.

The motion signals S80 and S40 are applied directly and the motion signal S20 via a change-over circuit SC5 to the encoder circuit DATV ENC, the time-division multiplex circuit MUX1 and to two time-division multiplex circuits MUX2 and MUX3. The circuits MUX2 and MUX3 are coupled to outputs of the circuits PCU and PCV. For simplicity, the circuits MUX are shown in the drawing as mechanical switches each having three input terminals T20, T40 and T80 and an output terminal T0, but in practice they operate as electronic switches. When the motion signal S20, S40 or S80 is applied, the terminal T20, T40 or T80, respectively, is through-connected to the terminal T0 and signals Y20, U20, V20; Y40, U40, V40 and Y80, U80, V80, respectively, are conveyed. Picture signal refresh periods equal to 20, 40 and 80 ms, respectively, are denoted by 20, 40 and 80. By way of example the values for the shortest, medium and longest picture signal refresh periods are mentioned. More periods and other time durations are possible. The terminals T0 are coupled to inputs of the encoder circuit MAC ENC. In the described, known manner the signals Y1, U1 and V1 are obtained and are applied to the encoder circuit MAC ENC.

In accordance with a feature of the invention the switching circuit SC5 is present which is controlled from a manual or an automatic film mode circuit Film Mod Man or Aut, respectively, more specifically via a selector switch SW1. The circuit Film Mod Aut is supplied with the luminance signal Y0, wherein it is detected that motion is only present per picture period. Instead of this detection which follows from the use of a telecine-signal source, the circuit Film Mod Man can be operative when the use of the film mode is previously known. Instead of a separate circuit Film Mod Man such a circuit might be provided in the signal source DSS. In all three cases there is at the circuit output a film mode information FM which is applied to an output terminal T0 of the selector switch SW1 via an input terminal TA or TM. In the drawing, at the selector switch SW1, a free, unconnected terminal TT is shown which in the non-cine film mode is connected to the terminal T0. The terminal T0 of the selector switch SW1 is not only coupled to the switching circuit SC5 but also to the encoder circuit DATV ENC, the motion estimator Mot Est and the time-division multiplex circuits MUX2 and MUX3. The film information FM is encoded in the circuit DATV ENC into, for example, one film mode information bit which occurs in the signal at the output 0T. In addition, the film information FM shifts the threshold value of 12 picture elements per picture period at the motion estimator Mot Est so that the information "motion" also occurs in the motion signal S40 at higher values. Then a free, unconnected terminal TAM is connected in the switching circuit SC5 to an output terminal T0, instead of an input terminal TT to which the motion signal S20 is applied. It appears that in the film mode the motion signal S20 is suppressed when the circuits MUX are controlled and coding is effected in the circuit DATV ENC. For a design of the motion estimator Mot Est reference is made to the non-prepublished Netherlands Patent Application No. 8800452. To obtain an optimum estimation result in the film mode, reference is made to the non-prepublished Netherlands Patent Application No. 8801357. Herein the film information does not only shift the threshold value of 12 picture elements per picture period, but also the estimation of motion is adapted to a further extent by the choice of predetermined fields.

Depending on the fact whether film information FM is applied or not applied to the time-division multiplex circuits MUX2 and MUX3 these circuits operate in different manners. If the film information FM is applied and the motion signal S20 is suppressed at the same time, the circuits MUX2 and MUX3 (and MUX1) operate with picture signal refresh periods equal to 80 and 40 ms. If no film information FM is applied but all three motion signals S80, S40 and S20 are applied to the circuits MUX2 and MUX3, these circuits only operate with picture signal refresh periods equal to 80 and 20 ms. Thus, during a non-film mode (SW1, TT) a luminance encoding circuit (PCY, MUX1) is operative with all three picture signal channels PC1, PC2 and PC3, while chrominance encoding circuits (PCU, MUX2) and (PCV, MUX3) operate with the shortest and longest picture signal refresh periods, respectively, of 20 ms and 80 ms, respectively. During a film mode (SW1, TA, TM) the luminance encoding circuit (PCY, MUX1) and the chrominance encoder circuits (PCU, MUX2) and (PCV, MUX3) all three operate with the longest and the medium picture signal refresh periods of 80 and 40 ms, respectively, In the block circuit diagram of the high-definition picture display device of FIG. 2, the input IT is coupled to an input of a decoder circuit MAC DEC which operates in a manner complementary to, and the inverse of the encoder circuit MAC ENC of FIG. 1. References used in FIG. 1 are used in a similar manner or in the same manner provided with an accent in FIG. 2. The circuit MAC DEC produces data signals and sound signals DS', SS', a luminance signal Y1' and chrominance signals U1' and V1'. An output of the circuit MAC DEC is coupled to an input of a decoder circuit DATV DEC which operates in a manner which is complementary to and the inverse of that of the encoder circuit DATV ENC. The circuit DATV DEC produces data signals DS', motion vectors VR', a film information FM' and signals S80, S40 and S20 in the non-film mode (SW1, TT).

Figure 2:
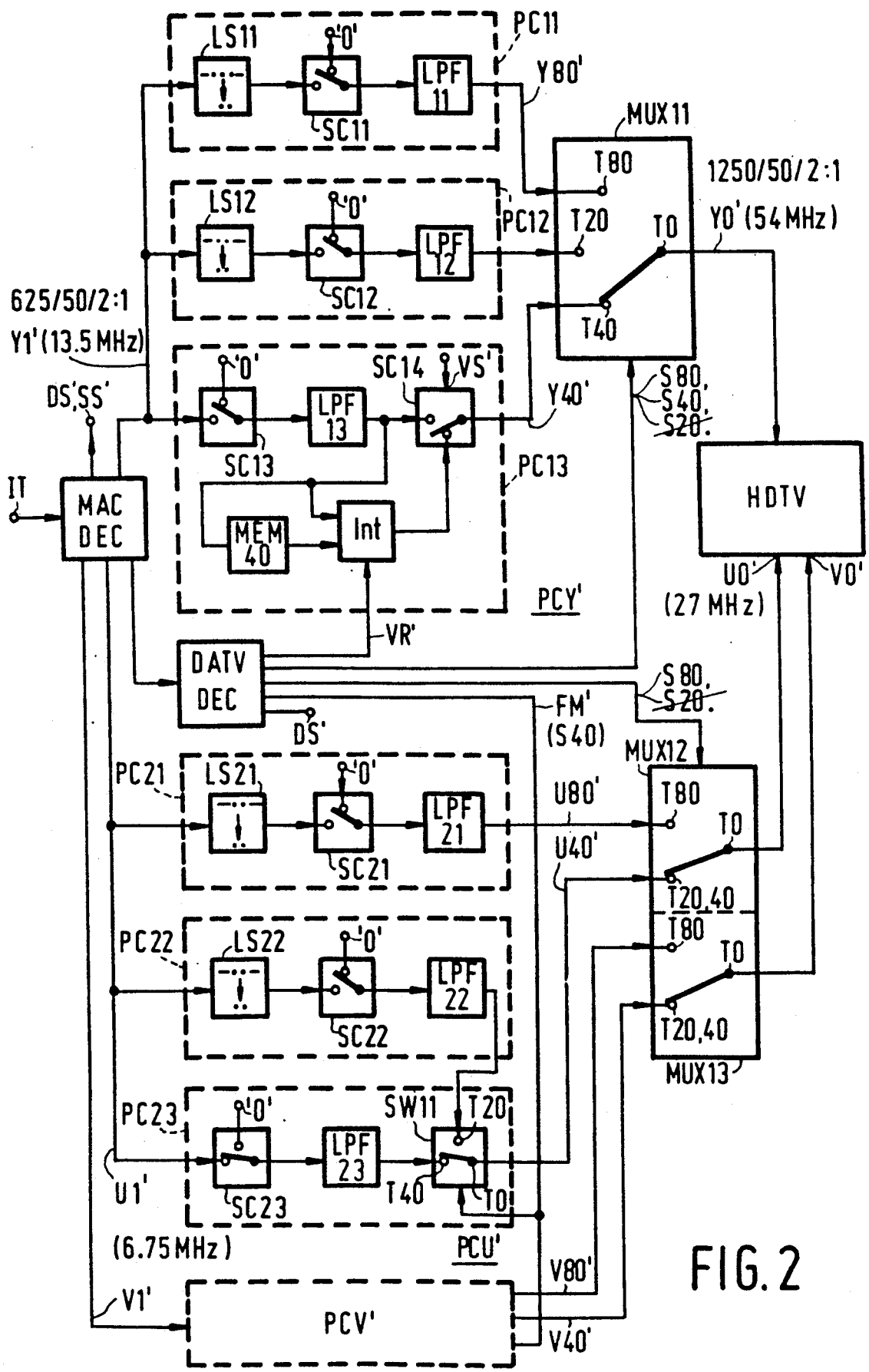

In the film mode (SW1, TA, TM) described with reference to FIG. 1, the signals S20 do not occur, which is illustrated in FIG. 2 by the fact that S20 is deleted there. A time-division multiplex circuit MUX11, the operation of which follows that of the circuit MUX1 of FIG. 1, is supplied with the signals S80 and S40. The signal S80 is applied to time-division multiplex circuits MUX12 and MUX13, the absence of this signal S80 implying an information (S40). For the sake of clarity, the information (S40) is denoted at the film information FM'.

FIG. 2 shows an Y-signal processing circuit PCY' comprising three signal channels PC11, PC12 and PC13. The channels PC11 and PC12 operate in a manner complementary and inversely to the channels PC1 and PC2 of FIG. 1. The channel PC1 comprises a series arrangement of a line shift circuit LS11, a sample insertion circuit SC11 and a low-pass filter LPF11. Inserting the samples is denoted at the circuit SC11 by "0" and a change-over switch. The channel PC12 is of an identical structure comprising circuits LS12 and LSC12 and a filter LPF12. In the film mode (SW1, TA, TM) only the output signals of signal channels PC11 and PC13 are employed, which are indicated by Y80' and Y40'.

The signal channel PC13 includes a sample insertion circuit SC13 and a subsequent low-pass filter LPF13. An output of the filter (LPF13) is coupled to inputs of a change-over circuit SC14, an interpolation circuit Int and a memory circuit MEM40 having a memory period equal to a 40 ms picture period. An output of the circuit MEM40 is coupled to a further input of the interpolation circuit Int, to a control input of which the motion vetors VR' are appled. An output of the interpolation circuit Int is coupled to a further input of the switching circuit SC14, to a switching input of which a signal VS' is applied. The switching circuit SC14 and the circuits Int and MEM40 operate complementary and inversely to the switching circuit SC4 of FIG. 1. This results in a signal Y40' being supplied by the signal channel PC13. A processed luminance signal YO' (54 MHz) is obtained via the time-division multiplex circuit MUX11 for application to a high-definition picture display device HDTV suitable for a (1250/50/2:1) display. In the presence of a low-definition picture display device, not shown, the signals produced by the MAC DEC decoder circuit can directly be utilized for the display. A compatibility between the high- and the low-definition display are here present. The circuit components between the circuit MAC DEC and the picture display device HDTV effect a bandwidth reduction decoding to the high definition.

FIG. 2 shows a U1'-signal processing circuit PCU' in detail, it being assumed that a V1'-signal processing circuit PCV' is of a similar structure. Comparable to the signal channel PC11, a signal channel PC21 is provided with a line shifting circuit LS21, a sample insertion circuit SC21 and a low-pass filter LPF21 and supplies a signal U80'. A signal channel PC22 comprises circuits LS22 and SC22 and a low-pass filter LPF22, of which however an output is coupled to an input of a switching circuit SW11 which further forms part of a signal channel PC23. In the signal channel PC23 the signal U1' is applied to a further input of the switching circuit SW11 via a sample insertion circuit SC23 and a low-pass filter LPF23. T20 and T40 denote input terminals of the circuit SW11 which are connectable to an output terminal TO under the control of the film information FM' (S40). In this situation, the switching circuit SW11 has a film mode position (SW11, T40) and a non-film mode position (SW11, T20). FIG. 2 illustrates that during the film mode (SW1, TA, TM) of FIG. 1 and (SW11, T40) of FIG. 2, the signal channels PC21 (80 ms) and PC23 (40 ms) are operative in a chrominance decoder circuit (PCU', MUX12), during the non-film modes (SW1, TT) of FIG. 1 and (SW11, T20) of FIG. 2, the signal channels PC21 (80 ms) and PC22 (20 ms) being active. At the circuits MUX12 and MUX13 this is shown in greater detail by means of terminals T80 and T20, 40. The same as the circuit PCU' produces the signals U80' and U40' during the film mode (SW1 TA, TM) and (SW11, T40), the circuit PCV' produces the signals V80' and V40'. As signals UO' and VO' (27 MHz) these signals are applied to the high-definition picture display device HDTV. Thus, the signals YO', UO' and VO' are applied via a synchronized time-division multiplex circuit (MUX11, 12, 13) to the picture display device HDTV, under the control of the signals S80, S40 and, possibly, S20, which are obtained from the estimation results. It is achieved that the system as shown in FIGS. 1 and 2 operates with a film mode (SW1, TA, TM) and (SW11, T40) and a non-film mode (SW1, TT) and (SW11, T20). During the film mode the picture signal source of FIG. 1 and more specifically the source DSS therein supplies a picture signal associated with a film having frames between which motion is present in the pictures, more specifically periodically with a film frame period of approximately 40 ms. During the film mode the picture signal channel (for example PC2) in the encoder circuit (for example PCY, MUX1) and the picture signal channel (for example PC12) in the decoder circuit (for example PCY', MUX11) having the picture signal refresh period of 20 ms, is inoperative.

The detailed structure, shown in FIG. 2, of the circuits PCU' and MUX12 may be provided in FIG. 1, operating in the complementary, inverse mode, instead of the structure including the circuit PCU and MUX2.

In the foregoing numerous aspects are described in detail, which aspects are based on the following:

When the picture signal refresh periods equal to 80, 40 and 20 ms are used, the algorithm also implies a 25 Hz film mode in which the 20 ms signal channel is eliminated, as a result of which the picture resolution increases significantly in all aspects.

During the chrominance coding, no motion compensation is employed and two picture signal processing channels are active. During a 50 Hz mode, the 80 ms and 20 ms channels are used and during the 25 Hz film mode the 80 ms and 40 ms channels are used. Basically, the chrominance channels are identical to the luminance channels, comprising filters, sampling circuits and line shift circuits, but are operative for U and V input signals sampled at 27 MHz, producing a multiplex UV output signal. The film mode is indicated by one information bit.

During the motion estimation with the two threshold values 0.5 and 12 picture elements per 40 ms, only exceeding the threshold value at 0.5 picture element per 40 ms is taken into account during the 25 Hz film mode.

We claim:

1. Method of encoding a picture signal to obtain an encoded picture signal, comprising the steps of:
   receiving said picture signal,
   determining motion vectors relating to motion in a picture of said picture signal,
   obtaining a selection signal to select one operation mode out of a plurality of possible operation modes on said picture signal depending on said selection signal to obtain a picture signal to be encoded,
   digitally encoding said selection signal and said motion vectors to obtain an assisting signal to inform a decoder which one of said plurality of operation modes has been selected and about said motion vectors, and
   encoding said picture signal to be encoded and said assisting signal to obtain said encoded picture signal,
   characterized by
   receiving a film mode information signal indicating whether said picture signal originates from film, said selecting step further depending on said film mode information signal, and digitally encoding said film mode information signal, said assisting signal also comprising said film mode information signal to inform said decoder whether said picture signal originates from film.

2. Apparatus for encoding a picture signal to obtain an encoded picture signal, comprising:

means for receiving said picture signal, means coupled to said receiving means for determining motion vectors relating to motion in a picture of said picture signal, means for obtaining a selection signal, means coupled to said selection signal obtaining means for selecting one operation mode out of a plurality of possible operation modes on said picture signal depending on said selection signal to obtain a picture signal to be encoded, means coupled to said selection signal obtaining means and said motion vector determining means for digitally encoding said selection signal and said motion vectors to obtain an assisting signal to inform a decoder which one of said plurality of operation modes has been selected and about said motion vectors, and means coupled to said selecting means and said digitally encoding means for encoding said picture signal to be encoded and said assisting signal to obtain said encoded picture signal, characterized by means for receiving a film mode information signal indicating whether said picture signal originates from film, said selecting means being coupled to said film mode information signal receiving means to select said one operation mode further depending on said film mode information signal, and means for digitally encoding said film mode information signal, said assisting signal also comprising said film mode information signal to inform said decoder whether said picture signal originates from film.

3. Apparatus for decoding a picture signal to obtain a decoded picture signal, comprising:

means coupled to receive said picture signal for decoding said picture signal to obtain a picture signal to be processed and an assisting signal including a selection signal and a motion vector information signal, means coupled to said decoding means to receive said selection signal and said motion vector information signal for selecting one operation mode out of a plurality of possible operation modes on said picture signal to be processed depending on said selection signal, at least one of said plurality of possible operation modes including a motion compensated interpolation using said motion vector information signal, characterized in that said selecting means are further coupled to said decoding means to receive a film mode information signal included in said assisting signal to select said one operation mode further depending on said film mode information signal.

* * * * *